US010733103B2

(12) United States Patent
Steinmacher-Burow (10) Patent No.: US 10,733,103 B2
(45) Date of Patent: Aug. 4, 2020

(54) NON-BLOCKING DIRECTORY-BASED CACHE COHERENCE

(71) Applicant: International Business Machines Corporation, Armonk, NY (US)

(72) Inventor: Burkhard Steinmacher-Burow, Esslingen am Neckar (DE)

(73) Assignee: International Business Machines Corporation, Armonk, NY (US)

(\*) Notice: Subject to any disclaimer, the term of this patent is extended or adjusted under 35 U.S.C. 154(b) by 55 days.

(21) Appl. No.: 15/839,975

(22) Filed: Dec. 13, 2017

(65) Prior Publication Data

US 2019/0179753 A1 Jun. 13, 2019

(51) Int. Cl.
*G06F 12/08* (2016.01)
*G06F 12/0817* (2016.01)
(Continued)

(52) U.S. Cl.
CPC ........ *G06F 12/0828* (2013.01); *G06F 12/084* (2013.01); *G06F 12/0817* (2013.01);
(Continued)

(58) Field of Classification Search
CPC ............... G06F 12/084; G06F 12/0842; G06F 12/0815; G06F 2212/62; G06F 12/0817;
(Continued)

(56) References Cited

U.S. PATENT DOCUMENTS 6,088,771 A 7/2000 Steely, Jr. et al.
8,190,820 B2 5/2012 Thantry et al.
(Continued)

FOREIGN PATENT DOCUMENTS

WO 2016202393 A1 12/2016

OTHER PUBLICATIONS

Lo et al., "Improving GPU Memory Performance with Artificial Barrier Synchronization", IEEE Transactions on Parallel and Distributed Systems, vol. 25, No. 9, Sep. 2014, 11 pages.
(Continued)

*Primary Examiner* — Reginald G Bragdon
*Assistant Examiner* — Thanh D Vo
(74) *Attorney, Agent, or Firm* — Stephen R. Yoder; Gilbert Harmon, Jr.

(57) ABSTRACT

A computer implemented method for managing cache requests includes creating a transient table including records corresponding to one or more participant caches in a system, receiving a new request with respect to an address, wherein the request includes one or more controller actions to be executed, and wherein the request corresponds to one of the one or more participant caches in the system, determining whether an entry exists in the directory table corresponding to the address indicated by the received request, determining whether an entry exists in the transient table for the address indicated by the received request, processing the transient entry indicated by the index in the directory entry to provide a current state of the address indicated by the received request, and appropriating requested controller actions according to the directory table entry, the transient entry, and the received request.

9 Claims, 4 Drawing Sheets

(51) Int. Cl.
*G06F 12/1009* (2016.01)
*G06F 12/1027* (2016.01)
*G06F 12/084* (2016.01)

(52) U.S. Cl.
CPC ...... *G06F 12/1009* (2013.01); *G06F 12/1027* (2013.01); *G06F 2212/621* (2013.01); *G06F 2212/65* (2013.01)

(58) Field of Classification Search
CPC ............. G06F 12/0828; G06F 12/0891; G06F 13/1663; G06F 2212/682
See application file for complete search history.

(56) References Cited

U.S. PATENT DOCUMENTS

| | | | |
|---|---|---|---|
| 8,832,403 | B2 | 9/2014 | Ohmacht |
| 8,930,636 | B2 | 1/2015 | McCormack et al. |
| 9,274,856 | B2 | 3/2016 | Guthrie et al. |
| 2011/0078692 | A1 | 3/2011 | Nickolls et al. |
| 2011/0153307 | A1* | 6/2011 | Winkel ................... G06F 9/455 703/26 |
| 2013/0103912 | A1* | 4/2013 | Jones .................. G06F 12/0891 711/144 |
| 2016/0179674 | A1 | 6/2016 | Sury et al. |
| 2016/0232106 | A1* | 8/2016 | Chakrala ............. G06F 12/1027 |
| 2017/0046264 | A1 | 2/2017 | Guthrie et al. |
| 2017/0052894 | A1 | 2/2017 | Parikh et al. |

OTHER PUBLICATIONS

Maranget et al., "A Tutorial Introduction to the ARM and POWER Relaxed Memory Models", INRIA, University of Cambridge, Oct. 10, 2012, Revision: 120, 50 pages.

Steinmacher-Burow, Burkhard, U.S. Appl. No. 15, filed Dec. 13, 2017, 41 pages.

IBM, Appendix P, list of patents or patent applications treated as related, filed herewith, 2 pages.

Kong et al., "A Non-blocking Directory Protocol for Large-Scale Multiprocessors", Technical Report, Department of Computer Science and Engineering, University of Minnesota, Apr. 8, 1999, 25 pages.

Raina, Sanjay, "Emulation of a Virtual Shared Memory Architecture", Thesis, University of Bristol, Sep. 1993, 199 pages.

Subramaniam et al., "Using In-Flight Chains to Build a Scalable Cache Coherence Protocol", ACM Trans. Architec. Code Optim. 10, 4, Article 28 (Dec. 2013), 24 pages, DOI: http://dx.doi.org/10.1145/2541228.2541235.

Yongqin et al., "A Novel Directory-Based Non-Busy, Non-Blocking Cache Coherence", 2009 International Forum on Computer Science-Technology and Applications, © 2009 IEEE, DOI 10.1109/IFCSTA.2009.97, 6 pages.

* cited by examiner

| Addr Tag | T = 0 | Writer Bit | ID Field |
|---|---|---|---|
| Addr Tag | T = 1 | Index to transient entry | |
| Addr Tag | T = 0 | Writer Bit | ID Field |
| Addr Tag | T = 1 | Index to transient entry | |

310

| Participant Cache | LATEST_STATE | RECEIVED_REQUEST | SENT_REQUEST |
|---|---|---|---|
| A | | | |
| B | | | |
| C | | | |

NON-BLOCKING DIRECTORY-BASED CACHE COHERENCE

BACKGROUND OF THE INVENTION

The present invention relates generally to the field of cache coherence, and more specifically to enabling directory-based coherence using a transitory table.

Cache coherence refers to the uniformity of shared resource data that ends up stored in multiple local caches. Incoherent data can result from clients in a system maintaining caches of a common memory resource. Cache coherence mechanisms manage such conflicts by maintaining a coherent view of data values in multiple caches to identify scenarios where they may not match. Directory-based coherence is a particular mechanism for handling cache coherence issues. Directory-based coherence uses a special directory to serve coherence instead of using a shared bus. The special directory facilitates communication between multiple nodes to assure that coherence protocol is working correctly along all communicating nodes. In directory based cache coherence, the directory keeps track of the status for all cache blocks, where the status of a block includes a cache coherent state as well as an indication of which nodes share said block.

SUMMARY

As disclosed herein, a computer implemented method for managing cache requests includes creating a transient table including records corresponding to one or more participant caches in a system, receiving a new request with respect to an address, wherein the request includes one or more controller actions to be executed, and wherein the request corresponds to one of the one or more participant caches in the system, determining whether an entry exists in the directory table corresponding to the address indicated by the received request, determining whether an entry exists in the transient table for the address indicated by the received request, processing the transient entry indicated by the index in the directory entry to provide a current state of the address indicated by the received request, and appropriating requested controller actions according to the directory table entry, the transient entry, and the received request. A computer program product and a computer system corresponding to the method are also disclosed.

DETAILED DESCRIPTION

The present invention will now be described in detail with reference to the Figures. Implementation of embodiments of the invention may take a variety of forms, and exemplary implementation details are discussed subsequently with reference to the Figures.

Figure 1:
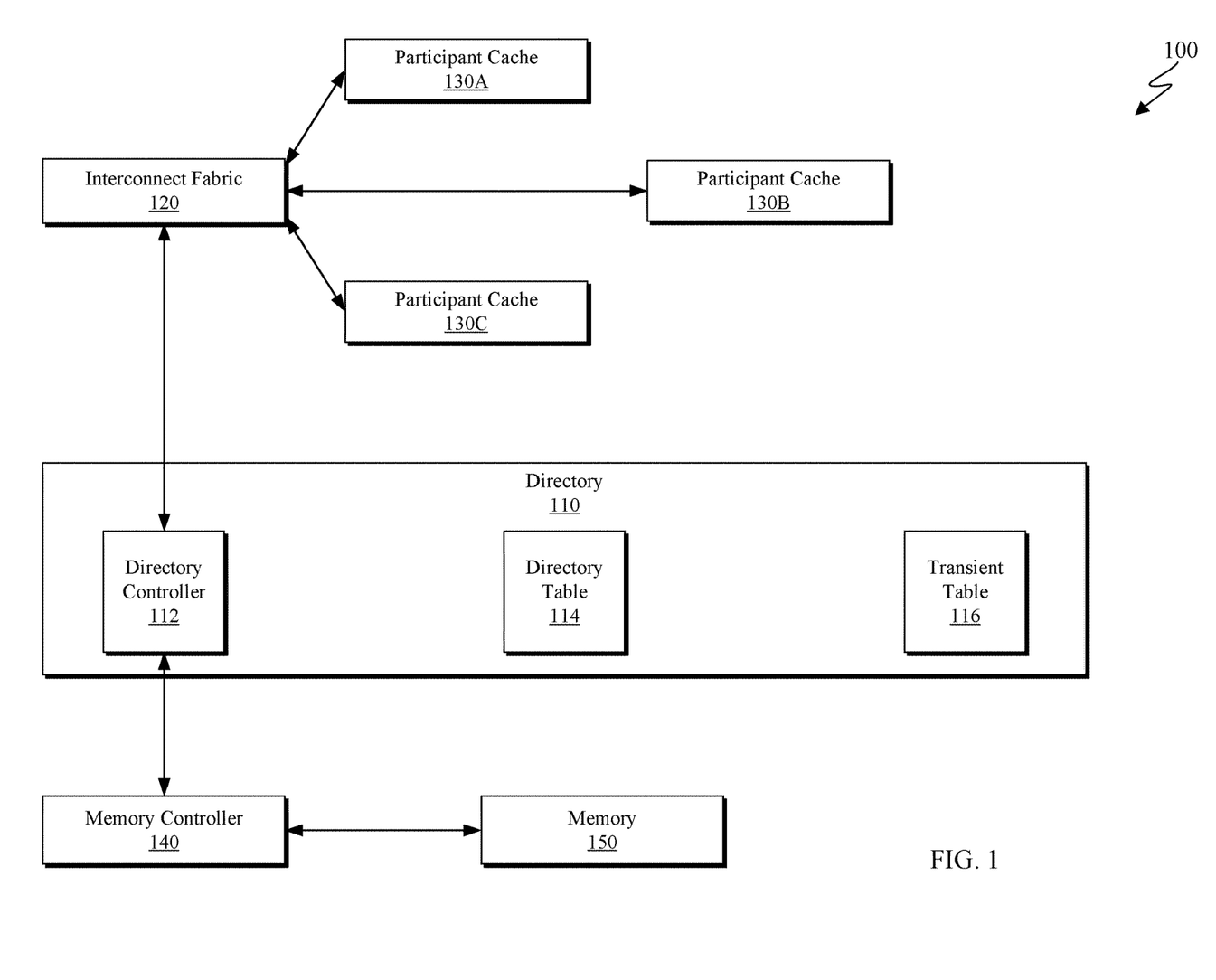
FIG. 1 is a block diagram depicting an directory-based coherence system in accordance with at least one embodiment of the present invention.

FIG. 1 is a block diagram depicting an directory-based coherence system 100 in accordance with at least one embodiment of the present invention. As depicted, directory-based coherence system 100 includes directory 110, interconnect fabric 120, participant caches 130, memory controller 140, and memory 150. Directory-based coherence system 100 enables cache coherence in systems implementing non-uniform memory access and in systems implementing uniform memory access.

As depicted, directory 110 includes directory controller 112, directory table 114, and transient table 116. Directory 110 maintains information of the state of each cache block in the system. A copy of a memory block in a participant cache is a cache block. A cache block is identified by an address. In at least some embodiments, directory controller 112 receives and sends requests to participant caches 130 via interconnect fabric 120. Directory controller 112 may additionally store an updated cache block to memory 150 via memory controller 140. In at least some embodiments, directory controller 112 utilizes directory table 114 and transient table 116 to maintain state information corresponding to the cache blocks in the participant caches. Example formats for the directory table 114 and the transient table 116 are depicted with respect to FIG. 3. In at least one embodiment, directory table 114 is a table containing information corresponding to one or more participant caches, as well as an indication of whether or not the address is currently in a stable state. For example, a transient bit in directory table 114 may be set to T=0 or T=1, wherein T=0 indicates that the corresponding cache is stable, and T=1 indicates that the corresponding cache is not stable. Transient table 116 may contain outstanding request information corresponding to the participant caches.

Interconnect fabric 120 may be a computing fabric consisting of interconnected nodes that resemble a weave or a fabric when viewed collectively. In at least some embodiments, interconnect fabric 120 corresponds to a consolidated high-performance computing system consisting of loosely coupled storage, networking and parallel processing functions linked by high bandwidth interconnects. Interconnect fabric 120 can also correspond to a grid computing system in general. While interconnect fabric 120 is depicted separate from the participant caches 130 with respect to the depicted embodiment, it should be appreciated that in additional embodiments, the participant caches may be individual nodes within an interconnect fabric with which directory 110 communicates. In the depicted embodiment, the interconnect fabric 120 receives requests from and sends requests to each of participant nodes 130 and the directory 110.

Each of participant caches 130 corresponds to a hardware or software component that stores data so future requests for said data can be served faster. In an embodiment, each of participant caches 130 serves the memory access requests of a processor local to the participant cache. The data stored in each participant cache 130 can be the result of previous computations, the duplicate of data stored elsewhere, or any other data format known in the art. With respect to the depicted embodiment, participant caches 130 are configured to receive requests from and send requests to directory 110 via interconnect fabric 120. Each memory block of memory 150 may have a corresponding entry in the directory table 114 containing details specific to the zero or one cache block copy of the memory block in each corresponding participant cache 130. Each of participant caches 130 may be stored on a separate chip, or may be stored on a shared chip along with (or separate from) directory 110, memory controller 140 and memory 150.

Memory controller 140 may be a digital circuit configured to manage the flow of data going to and from memory 150. In some embodiments, memory controller 140 is a separate chip from the other components of directory-based coherence system 100. In other embodiments, memory controller 140 may be integrated into another element of directory-based coherence system 100. Memory 150 may be any volatile or non-volatile storage media known in the art. For example, memory 150 can be implemented with DRAM or Phase-Change Memory or NAND Flash. Similarly, data in memory 150 may conform to any suitable storage architecture known in the art, such as a file, a relational database, an object-oriented database, and/or one or more tables. With respect to the depicted embodiment, memory 150 may be configured to store information associated with directory table 114 and transient table 116 as provided by directory controller 112 via memory controller 140.

Figure 2:
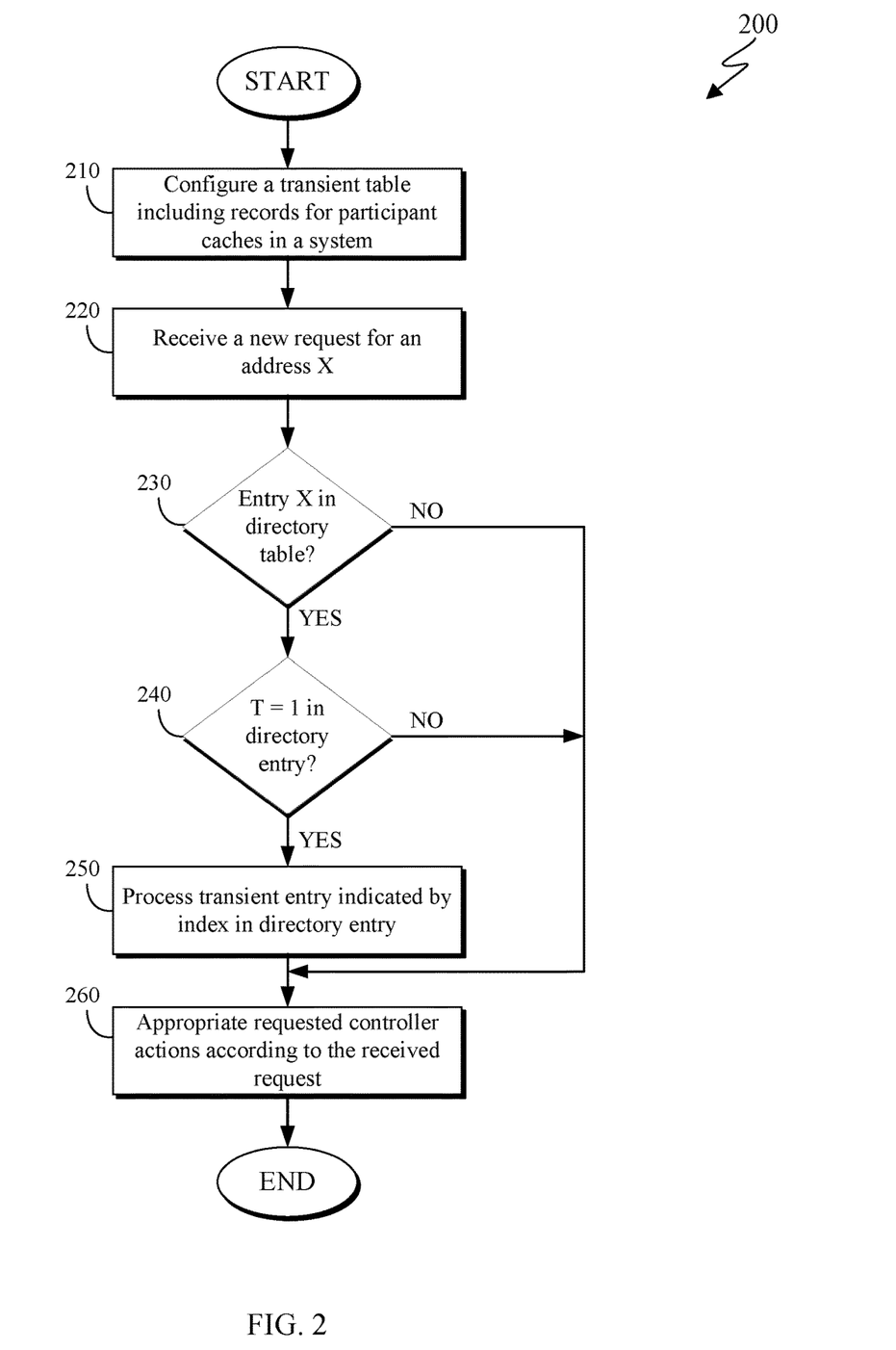
FIG. 2 is a flowchart depicting a cache management method in accordance with at least one embodiment of the present invention.

FIG. 2 depicts a cache coherence management method 200 in accordance with at least one embodiment of the present invention. As depicted, cache coherence management method 200 includes creating (210) a transient table including records for participant caches in a system, receiving (220) a new request for an address "X", determining (230) whether an entry exists in the directory table for address "X", determining (240) whether an entry exists in the transient table for address "X", processing (250) the transient entry indicated by the index in the directory entry, and appropriating (260) requested controller actions according to the director entry, the transient entry, and the received request. Cache coherence management method 200 enables directory-based coherence with minimal resource requirements.

Creating (210) a transient table including records for participant caches in a system, may include creating a transient table containing a set of transient entries, with each transient entry corresponding to a single memory block with a unique address from within a system. In at least some embodiments, the created transient table includes, for each entry, a latest state known by the directory, any outstanding requests received by the directory from the participant caches, and any outstanding request sent by the directory to the participant caches. Creating (210) a transient table including records for participant caches may additionally include adding to each directory entry a bit, hereinafter referred to as 'T', which acts as an index to a valid transient entry for the corresponding memory block. An entry in the transient table may be created each time a cache enters a transient state. In some embodiments, creating each entry in the transient table begins by identifying an unused entry in the transient table and writing the data for a cache block entering a transient state in said unused entry. Certain situations may allow a smaller number of memory blocks to be in a transient state compared to the number of memory blocks in stable state; utilizing available empty transient entries in this manner as opposed to reserving a transient entry for each directory entry enables a smaller transient table to be used.

Receiving (220) a new request on an address "X" may include receiving a request from a participant cache for a specific address "X". The received request may be a read request, a write request, or any other known request appropriate for execution with respect to address "X". The node issuing the request on the address "X" may be referred to as a requestor node. The request is received by a directory node, which maintains the information of the state of each cache block in the system.

Determining (230) whether an entry exists in the directory table for address "X" may include parsing a directory table managed by the directory node to identify an entry corresponding to address "X" of a memory block. In an embodiment where each address is uniquely named, determining (230) whether an entry exists in the directory table for address "X" includes executing a search on the directory table to determine if a string in the address column of the directory table matches address "X". In at least some embodiments, data is transferred between memory and cache in blocks of fixed size, referred to as cache lines or cache blocks. When a cache line is copied from memory into the cache, a cache entry is created. The cache entry will included the copied data as well as a requested memory location, sometimes called an address tag. If it is determined an entry exists in the directory table for address "X" (230, yes branch), the method continues by determining (240) whether an entry exists in the transient table for address "X". If it is determined an entry does not exist in the directory for address "X" (230, no branch), the method continues by appropriating (260) the requested controller actions according to the received request.

Determining (240) whether an entry exists in the transient table for address "X" may include parsing the created transient table managed by the directory node to identify an entry corresponding to address "X". In an embodiment where each address is uniquely named, determining (230) whether an entry exists in the directory table for address "X" includes executing a search on the directory table to determine if a string in the address column of the directory table matches address "X". Other available address details may be used to identify the proper entry in the transient table in embodiments where each of the addresses are not uniquely named. In one embodiment, determining (240) whether an entry exists in the transient table for address "X" includes determining whether a T bit of the corresponding directory table entry is set to 1. If it is determined that an entry exists in the transient table for address "X" (240, yes branch), the method continues by processing the transient entry indicated by the index in the directory entry. If it is determined that an entry does not exist in the transient table for address "X" (240, no branch), the method continues by appropriating (260) the requested controller actions according to the received request.

Processing (250) the transient entry indicated by the index in the directory entry may include determining the current state of the address "X" according to the transient entry. In some embodiments, each entry in the transient table corresponds to an address X and indicates for each participant cache a latest state, any outstanding request received by the directory, and any outstanding request sent by the directory. In such embodiments, processing (250) the transient entry indicated by the index includes updating the transient entry indicated by the index in the directory entry to reflect the received request. Processing (250) the transient entry indicated by the index in the directory entry includes identifying a current state of address "X" along with any outstanding requests prior to executing the received request on address "X".

Appropriating (260) requested controller actions according to the director entry, the transient entry, and the received request may include executing the received request on address "X". Executing the received request on address "X" may require the transient table entry corresponding to address "X" to be updated. For example, if the request on address "X" places address "X" into a transient state, an entry in the transient table may need to be created or updated to reflect the outstanding request. If the received request places address "X" in a stable state, the transient table may need to be updated such that the latest state entry reads "Stable". In some embodiments, where the received request places address "X" in a stable state, the transient table entry corresponding to address "X" is transferred to the directory entry and the transient entry is cleared to make room for an entry corresponding to another address. As used herein, an entry in a stable state indicates that the directory has no outstanding request to or from the corresponding participant cache.

Figure 3:
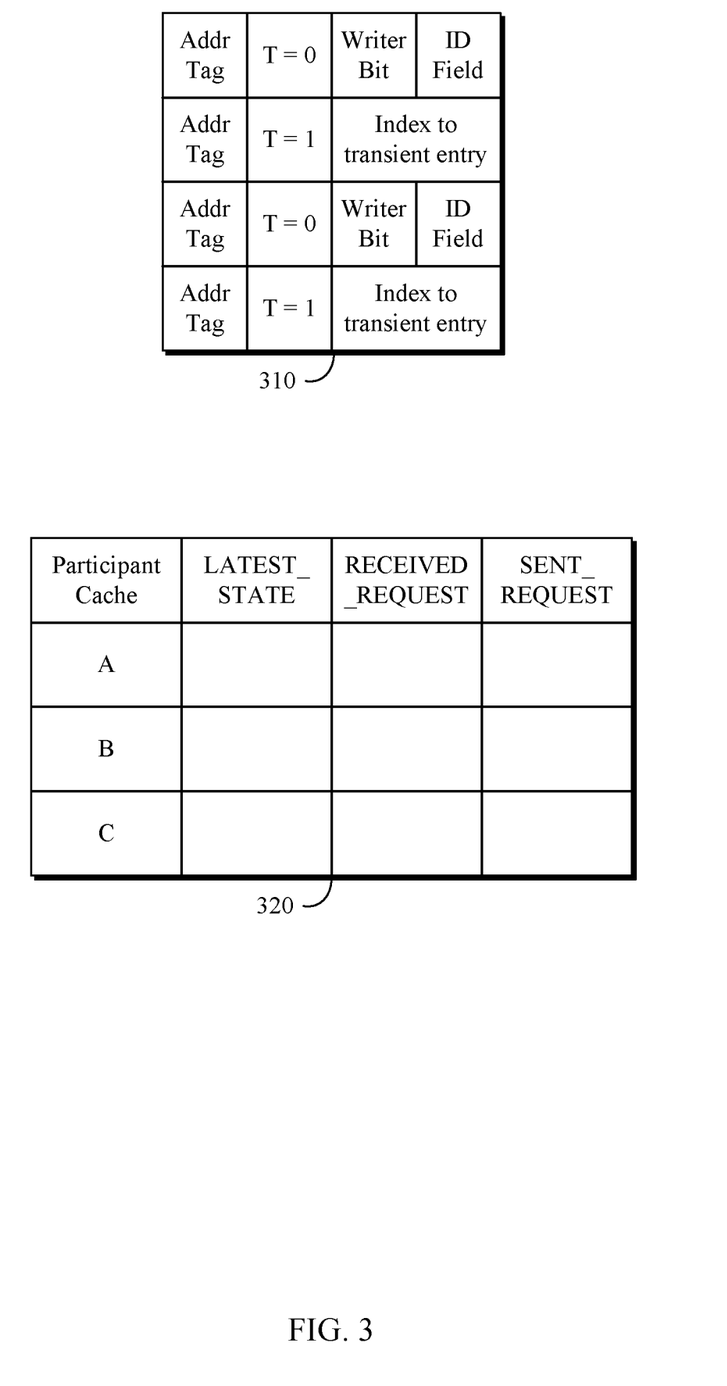
FIG. 3 depicts an example of a directory table and a transient table entry in accordance with at least one embodiment of the present invention.

FIG. 3 depicts an example of a directory table 310 with 4 directory entries and a transient table entry 320 in accordance with one embodiment of the present invention. As depicted, each row of directory table 310 is a directory entry and corresponds to a unique address, indicated by the address tag (labeled Addr Tag) in each entry in the first column. In an embodiment, an invalid directory entry is indicated by an invalid value for its Addr Tag. Each entry in the second column of each row, in other words of each directory entry, corresponds to a transient bit that indicates whether or not there exists an entry in the transient table 116 corresponding to the address indicated by the Addr Tag in the directory entry. In some embodiments, a non-zero entry in the transient bit column indicates that the corresponding address is not in a stable state, also known as a transient state. For a row which has a zero entry in the transient bit column, the following two columns contain an indication of the writer bit and the ID field corresponding to the address indicated by said row. If the writer bit is set, the ID field identifies the participant cache with write access to the cache block. If the writer bit is not set, the ID field identifies the one or more participant caches, each with a non-writable shared-read access to the cache block. For a row which does have a corresponding transient table entry, the remaining column includes an index to the corresponding entry in the transient table. Thus the transient entry is located without searching a table of transient entries, thus reducing computer resources.

Transient table entry 320 is one example of a transient table adequate for tracking participant cache status. As depicted, transient table entry 320 includes four columns. The first column indicates a participant cache. In an embodiment, the first column may not be explicit and instead a first participant cache is identified by the first row, a second participant cache is identified by the second row and so on. The second column indicates the latest stable state known by the directory for the address at the participant cache. In an embodiment, the second column contains a label indicating 1 of the 4 states (ModifiedWrite, ExclusiveWrite, SharedRead. Invalid) of the MESI protocol for the address at the participant cache. As used herein, a cache is considered to be in a stable state if it has no outstanding received or outgoing requests. The third column of transient table entry 320 indicates any outstanding request received by the directory from the participant cache. Similarly, the fourth column of transient table entry 320 indicates any outstanding request sent by the directory to the participant cache.

Figure 4:
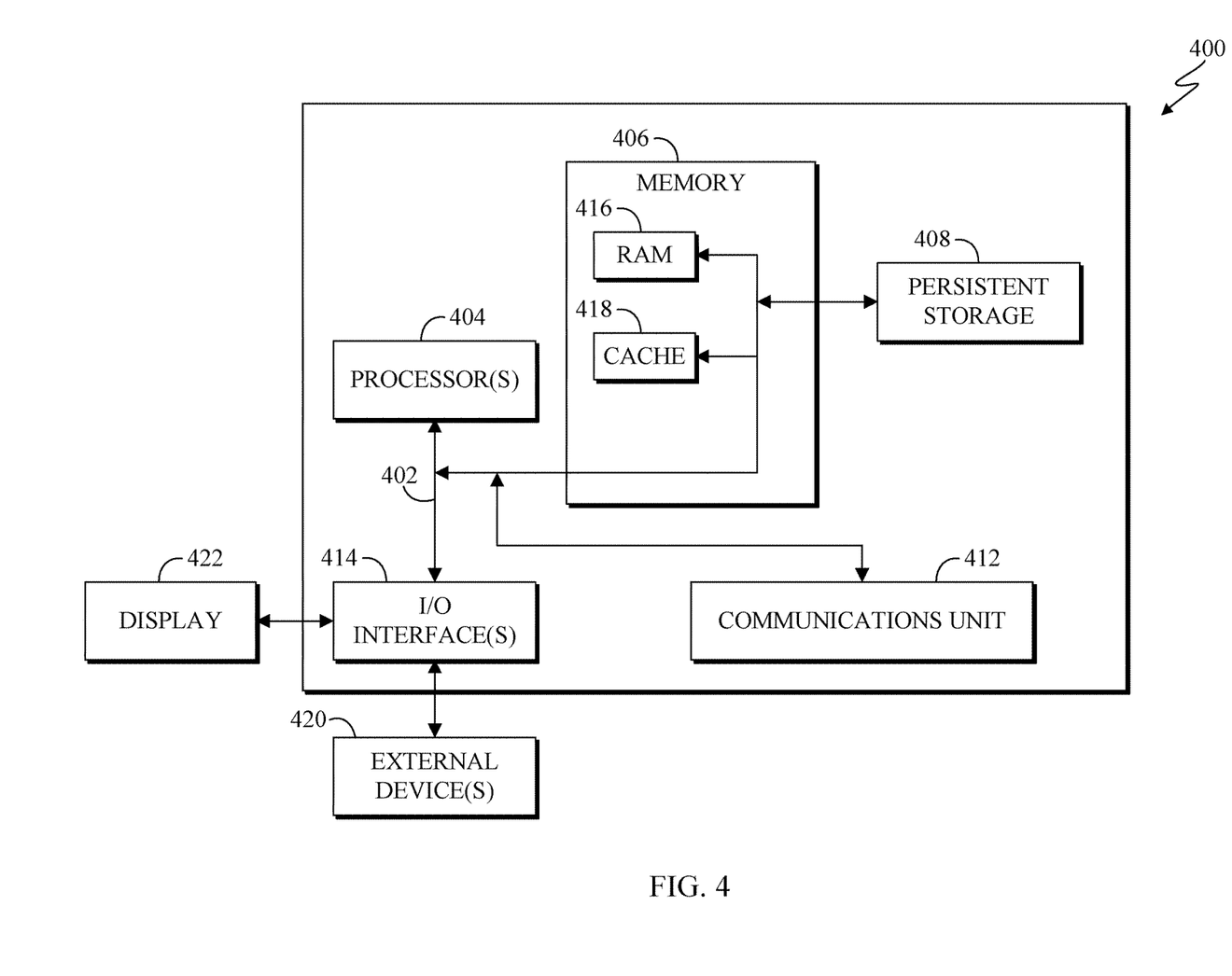
FIG. 4 depicts a block diagram of components of a computer, in accordance with some embodiments of the present invention.

FIG. 4 depicts a block diagram of components of computer 400 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 416 and cache memory 418. In general, memory 406 can include any suitable volatile or non-volatile computer-readable storage media.

One or more programs may be stored in persistent storage 408 for access and/or execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 414. I/O interface(s) 414 also connect to a display 422.

Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method comprising:

creating a transient table including records corresponding to one or more participant caches in a system, wherein each entry of the created transient table provides a current state of a cache line at all the participant caches in the system;

adding a single transient bit to one or more entries of a directory table, wherein the transient bit indicates whether or not an address indicated by a directory table entry is stable, and wherein an entry is considered stable when there are no outstanding requests to or from a corresponding address;

receiving a new request with respect to an address, wherein the new request includes one or more controller actions to be executed, and wherein the new request corresponds to one of the one or more participant caches in the system;

determining whether an entry exists in the directory table corresponding to the address indicated by the received new request;

responsive to determining that an entry exists in the directory table corresponding to the address indicated by the received new request, determining whether an entry exists in the transient table for the address indicated by the received new request;

responsive to determining that an entry exists in the transient table for the address indicated by the received request, processing the transient entry indicated by an index in the directory entry to provide a current state of the address indicated by the received request;

appropriating requested controller actions according to the directory table entry, the transient entry, and the received request; and updating the single transient bit in the directory table corresponding to the address indicated by the received request to reflect the current state of the address indicated by the received request.

2. The computer implemented method of claim 1, wherein each entry of the created transient table indicates whether there are any unresolved requests either sent by or received by the corresponding participant cache.

3. The computer implemented method of claim 1, further comprising adding an index to one or more entries of the directory table, the index indicating where a corresponding entry in the transient table is located.

4. A computer program product comprising:

one or more computer readable storage media and program instructions stored on the one or more computer readable storage media, the program instructions comprising instructions to:

create a transient table including records corresponding to one or more participant caches in a system, wherein each entry of the created transient table provides a current state of a cache line at all the participant caches in the system;

add a single transient bit to one or more entries of a directory table, wherein the transient bit indicates whether or not an address indicated by a directory table entry is stable, and wherein an entry is considered stable when there are no outstanding requests to or from a corresponding address;

receive a new request with respect to an address, wherein the new request includes one or more controller actions to be executed, and wherein the new request corresponds to one of the one or more participant caches in the system;

determine whether an entry exists in the directory table corresponding to the address indicated by the received new request;

responsive to determining that an entry exists in the directory table corresponding to the address indicated by the received new request, determine whether an entry exists in the transient table for the address indicated by the received new request;

responsive to determining that an entry exists in the transient table for the address indicated by the received request, process the transient entry indicated by an index in the directory entry to provide a current state of the address indicated by the received request;

appropriate requested controller actions according to the directory table entry, the transient entry, and the received request; and update the single transient bit in the directory table corresponding to the address indicated by the received request to reflect the current state of the address indicated by the received request.

5. The computer program product of claim 4, wherein each entry of the created transient table indicates whether there are any unresolved requests either sent by or received by the corresponding participant cache.

6. The computer program product of claim 4, further comprising adding an index to one or more entries of the directory table indicating where a corresponding entry in the transient table is located.

7. A computer system comprising:

one or more computer processors;

one or more computer readable storage media;

program instructions stored on the one or more computer readable storage media, the program instructions comprising instructions to:

create a transient table including records corresponding to one or more participant caches in a system, wherein each entry of the created transient table provides a current state of a cache line at all the participant caches in the system;

add a single transient bit to one or more entries of a directory table, wherein the transient bit indicates whether or not an address indicated by a directory table entry is stable, and wherein an entry is considered stable when there are no outstanding requests to or from a corresponding address;

receive a new request with respect to an address, wherein the new request includes one or more controller actions to be executed, and wherein the new request corresponds to one of the one or more participant caches in the system;

determine whether an entry exists in the directory table corresponding to the address indicated by the received new request;

responsive to determining that an entry exists in the directory table corresponding to the address indicated by the received new request, determine whether an entry exists in the transient table for the address indicated by the received new request;

responsive to determining that an entry exists in the transient table for the address indicated by the received request, process the transient entry indicated by an index in the directory entry to provide a current state of the address indicated by the received request;

appropriate requested controller actions according to the directory table entry, the transient entry, and the received request; and update the single transient bit in the directory table corresponding to the address indicated by the received request to reflect the current state of the address indicated by the received request.

8. The computer system of claim 7, wherein each entry of the created transient table indicates whether there are any unresolved requests either sent by or received by the corresponding participant cache.

9. The computer system of claim 7, further comprising adding an index to one or more entries of the directory table indicating where a corresponding entry in the transient table is located.

* * * * *